(No Model.)
D. BEST.
WHEEL.
No. 433,193. Patented July 29, 1890.
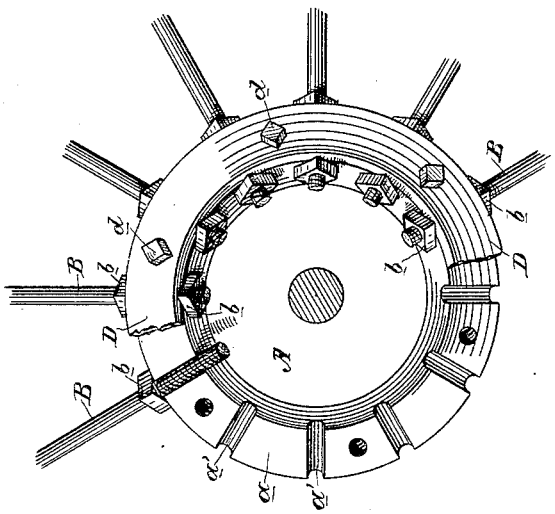
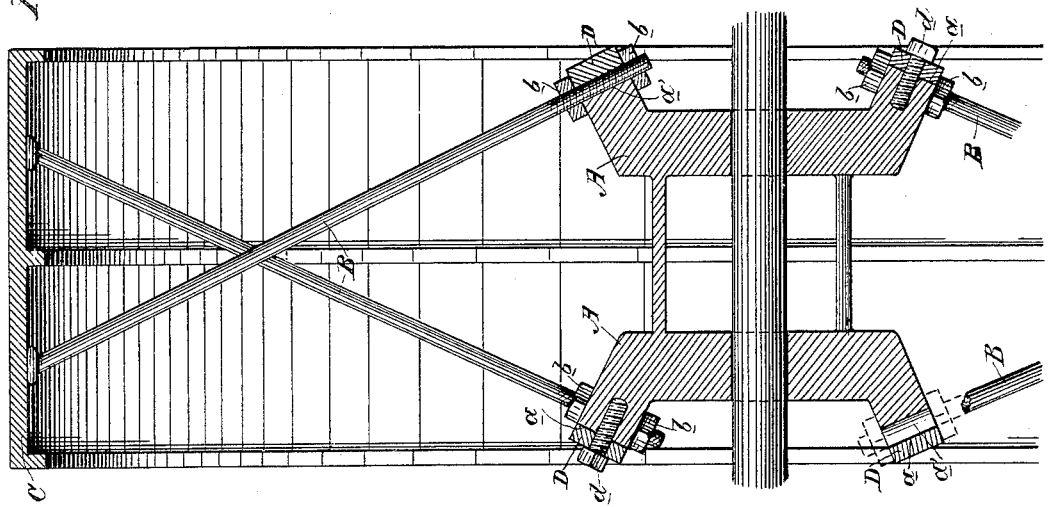
Witnesses
J. H. Nurse
H. C. Lee.
Inventor,
Daniel Best
By Dewey & Co.
Atty

UNITED STATES PATENT OFFICE.

DANIEL BEST, OF SAN LEANDRO, CALIFORNIA.

WHEEL.

SPECIFICATION forming part of Letters Patent No. 433,193, dated July 29, 1890.

Application filed November 20, 1889. Serial No. 331,007. (No model.)

*To all whom it may concern:*

Be it known that I, DANIEL BEST, a citizen of the United States, residing at San Leandro, Alameda county, State of California, have invented an Improvement in Wheel-Hubs; and I hereby declare the following to be a full, clear, and exact description of the same.

My invention relates to the general class of vehicle-wheels, and especially to those wheels which are to be used with very heavy vehicles, such as traction-engines or road-locomotives and other heavy implements.

My invention consists in the novel construction of hub and the attachment of the spokes thereto, hereinafter fully described, and specifically pointed out in the claims.

The object of my invention is to provide a construction which will permit the ready attachment of the spokes to the hubs and their removal therefrom when necessary.

Referring to the accompanying drawings for a more complete explanation of my invention, Figure 1 is a vertical section of my wheel-hub and wheel. Fig. 2 is a side view of the hub, a portion of the guard-ring D being broken away to show the spoke-grooves $a'$.

These wheels have usually a double hub, represented by A, and consisting of two separate flanges mounted upon the same shaft. The spokes B extend from the flanges of the double hub and cross each other, their outer ends being secured properly to the felly or rim C of the wheel. The flanges of the hub are usually made with their edges inclined, so as to receive in suitable inclined holes therein the inner end of the spokes, which pass through the holes and are secured by a nut on each side. Now, it is obvious that as the spokes are longer than the distance between the inner surface of the hub-flange and the inner surface of the rim it is a difficult matter to get the spokes in place, and this is usually done by bending the spoke and then straightening it after its inner end has been inserted in the hole of the hub-flange, so that it will pass through and project beyond the hole in order to receive the nut. To avoid this difficulty and to provide a construction which will enable me to readily insert the spokes without having to bend them at all, I have the following construction: The inner surfaces of the hub-flanges are beveled inwardly, as usual, and their outer surfaces $a$ are beveled outwardly in substantially the same plane as the line in which the spoke to be secured to the hub extends to the rim. In this beveled outer surface of each flange I make the grooves $a'$, which open inwardly from the surface, and into these grooves I lay the inner ends of the spokes B, first having fitted upon them the usual nuts $b$. Now, in order to secure the spokes in place, I fit to the outer beveled surfaces $a$ of the hub flanges an independent covering or guard-ring D, which is bolted securely thereto by bolts $d$ and covers the entire series of grooves $a'$, thereby forming perfect sockets for the inner ends of the spokes. When, for any purpose, it is found necessary to remove one or more of the spokes, the covering or guard-ring D is removed, whereby the inner ends of all the spokes are exposed, so that they can be easily removed.

Having thus described my invention, what I claim as new, and desire to secure by Letters Patent, is—

1. In a wheel, the hub thereof having flanges whose outer surfaces are beveled and formed with grooves which open inwardly from said surfaces, in combination with spokes fitted in said grooves, and a guard-ring bolted to said beveled surfaces to confine the spokes.

2. In a wheel, the combination of the hub-flanges A, having the beveled outer surfaces $a$ and the open-sided grooves $a'$, made in said surfaces, the inclined spokes B, the inner ends of which are fitted in the grooves, and the covering or guard-ring D, bolted to the outer surface of the hub-flanges and covering its grooves, whereby the spokes are confined, substantially as herein described.

In witness whereof I have hereunto set my hand.

DANIEL BEST.

Witnesses:
   W. S. PETERS,
   C. L. RIDEOUT.